US009104406B2

(12) United States Patent
Dabagh et al.

(10) Patent No.: US 9,104,406 B2
(45) Date of Patent: Aug. 11, 2015

(54) NETWORK PRESENCE OFFLOADS TO NETWORK INTERFACE

(75) Inventors: Alireza Dabagh, Kirkland, WA (US); Narasimha Rao S.S. Nagampalli, Redmond, WA (US); Robert C. Combs, Redmond, WA (US); Alexander Malysh, Bothell, WA (US); Narasimhan A. Venkataramaiah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 970 days.

(21) Appl. No.: 12/350,115

(22) Filed: Jan. 7, 2009

(65) Prior Publication Data

US 2010/0174808 A1 Jul. 8, 2010

(51) Int. Cl.
*G06F 15/177* (2006.01)
*G06F 1/32* (2006.01)

(52) U.S. Cl.
CPC ........... *G06F 1/3203* (2013.01); *Y02B 60/1217* (2013.01)

(58) Field of Classification Search
CPC .......................... G06F 1/3203; H04L 63/0407
USPC .................................. 709/221, 220, 223–224
See application file for complete search history.

(56) References Cited

U.S. PATENT DOCUMENTS

| | | | |
|---|---|---|---|
| 6,681,244 B1 * | 1/2004 | Cross et al. ................... | 709/203 |
| 7,299,266 B2 | 11/2007 | Boyd | |
| 8,644,396 B2 * | 2/2014 | Lee et al. ...................... | 375/259 |
| 2004/0034803 A1 * | 2/2004 | Hamilton ...................... | 713/300 |
| 2005/0198368 A1 * | 9/2005 | Fleming et al. ............... | 709/238 |
| 2006/0031524 A1 | 2/2006 | Freimugh | |
| 2006/0095754 A1 * | 5/2006 | Hyder et al. ...................... | 713/1 |
| 2006/0104308 A1 | 5/2006 | Pinkerton | |
| 2007/0011272 A1 | 1/2007 | Bakke | |
| 2007/0064725 A1 | 3/2007 | Minami | |
| 2007/0067445 A1 * | 3/2007 | Vugenfirer et al. ........... | 709/224 |
| 2007/0118742 A1 * | 5/2007 | Abhishek et al. ............. | 713/160 |
| 2007/0136495 A1 | 6/2007 | Boucher | |
| 2007/0271453 A1 * | 11/2007 | Pohja et al. .................... | 713/153 |
| 2007/0282951 A1 * | 12/2007 | Selimis et al. ................ | 709/205 |
| 2008/0016511 A1 * | 1/2008 | Hyder et al. .................. | 718/105 |

(Continued)

OTHER PUBLICATIONS

Chelsio, "Head-to-Toe Evaluation of High-Performance Sockets over Protocol Offload Engines," http://www.chelsio.com/eluster_2005_tech_report.html, retrieved Oct. 31, 2008.

(Continued)

*Primary Examiner* — Waseem Ashraf
(74) *Attorney, Agent, or Firm* — Sunah Lee; Kate Drakos; Micky Minhas (57) ABSTRACT

A computing device that has a network interface that performs a subset of possible networking functions while the computing device is in a sleep mode. The subset of functions may be simply implemented on the network interface, yet to substantially reduce the frequency with which the computing device has to wake up to perform networking functions. The subset of functions may be selected to maintain a network presence of the computing device while the device is in sleep mode, and may include responding to requests for MAC information, sending keep-alive messages or exchanging security information that, in accordance with network protocols, has a limited lifetime that would otherwise expire while the computing device is in sleep mode.

20 Claims, 6 Drawing Sheets

(56) References Cited

U.S. PATENT DOCUMENTS

| | | | |
|---|---|---|---|
| 2008/0068239 A1* | 3/2008 | Anderson et al. | 341/139 |
| 2008/0080701 A1* | 4/2008 | Goldenberg et al. | 379/399.01 |
| 2008/0219196 A1 | 9/2008 | Ptasinski | |
| 2008/0233962 A1* | 9/2008 | Hazra et al. | 455/437 |
| 2009/0086660 A1* | 4/2009 | Sood et al. | 370/311 |
| 2009/0132764 A1* | 5/2009 | Moll et al. | 711/118 |
| 2009/0154432 A1* | 6/2009 | Hassan et al. | 370/338 |
| 2009/0156191 A1* | 6/2009 | Hassan et al. | 455/418 |
| 2009/0219936 A1* | 9/2009 | Tripathi et al. | 370/392 |
| 2010/0023788 A1* | 1/2010 | Scott et al. | 713/320 |
| 2010/0058082 A1* | 3/2010 | Locker et al. | 713/320 |
| 2010/0131669 A1* | 5/2010 | Srinivas et al. | 709/233 |
| 2010/0165897 A1* | 7/2010 | Sood | 370/311 |

OTHER PUBLICATIONS

Chelsio, "Third-Generation 10Gb Ethernet Unified Wire Engine for iSCSI, RDMA and TCP/IP Applications," http://www.chelsio.com/t3_prod_brief.html, retrieved Oct. 31, 2008.

Microsoft, "New Networking Features in Windows Server 2008 and Windows Vista," http://technet.microsoft.com/en-us/library/bb726965.aspx, retrieved Oct. 31, 2008.

* cited by examiner

NETWORK PRESENCE OFFLOADS TO NETWORK INTERFACE

BACKGROUND

To reduce energy consumption, computing devices support sleep mode in which they consume less power than in active modes of operation. When a computing device is not actively in use, a power management system on the device may transition to a sleep mode by turning off components of the device. In sleep mode, the computing device cannot respond to user inputs. To support response to user inputs, some components of the computing device stay active to monitor input devices. When a user input is detected, those components can trigger the computing device to transition back to an active mode of operation for response to the user input.

A device connected to a network that is in sleep mode similarly cannot respond to requests directed to the device over the network. The computing device may support a Wake-on-LAN (WoL) mechanism that monitors messages received over the network. When the WoL mechanism detects a message directed to the computing device, it may wake up the computing device. The computing device can then respond to a request for information or other command in the received message.

WoL functionality is implemented using hardware components on a network interface card in the computing device. Circuitry on the network interface card that may detect messages addressed to the computing device may stay powered on, even when the computing device is in a sleep mode. That circuitry, upon detecting a message directed to the computing device, may assert a hardware signal line that triggers the processor or other components of the computing device to wake up to process the packet.

In some cases, the network interface card may contain circuitry implementing essentially all the functionality of a network stack. In this scenario, the network interface card itself may process received messages without waking other components of the computing device. However, offload of a network stack has not been widely implemented in network interface cards because of the cost and complexity of designing and manufacturing such network interface cards and integrating them into a computing system.

SUMMARY

The inventors have recognized and appreciated that power savings for networked computers can be improved without significant compromises on functionality of the computing devices through the incorporation of simple components on a network interface. These components may support a subset of network functionality that can be enabled when the computing device is in a sleep mode. These functions may be selected to maintain a network presence of the computing device without waking a processor of the computing device.

Improved power savings may be particularly significant in an enterprise environment in which there are multiple networked computing devices. In such environments, computing devices are required to perform functions to maintain their network presence at such a rate that there is little opportunity for entering sleep mode.

The inventors have recognized and appreciated that the subset of network functions required to maintain network presence is relatively small and that components to perform such functions may be readily implemented on a network interface card. These functions may include, for example, responding to a request such as an Address Resolution Protocol (ARP) request, a Neighbor Discovery Protocol (NDP) Neighbor Solicitation (NS) request, an Internet Protocol version 4 (IPv4) Internet Control Message Protocol (ICMP) echo request, and an Internet Protocol version 6 (IPv6) Internet Control Message Protocol (ICMP) echo request.

In some embodiments of the invention, the network interface card may be configured to initiate functions to maintain a network presence. For example, the network interface card may send keep-alive packets using a Teredo protocol to maintain a connection to the computing device over the network. Furthermore, network presence offload components of the network interface card may be configured to maintain a wireless connection to the computing device in the low power state. Thus, the components may periodically perform a handshake protocol used in the wireless connection and renegotiate, when required, encryption keys for the connection.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that, by offloading to a network interface during sleep mode only a subset of the network functions performed by a computing device, the computing device can be simply constructed yet can stay in a low power state for extended periods of time. In some embodiments, the subset of network functions offloaded to the network interface card consists essentially of those functions that maintain network presence of the computing device. In such embodiments, the offloaded functions provide information to other devices so that those other devices will continue to recognize the computing device as connected to the network, even though it is in sleep mode. Likewise, the subset of offloaded functions may include functions that obtain for the computing device information it needs to communicate with other devices over the network after it exits sleep mode. If, while in sleep mode, the computing device is required to perform functions not within the selected subset of functions, those functions may be performed using conventional Wake-on-LAN processing, or in any other suitable way.

Though the present invention is not limited by the environment in which it is implemented, Applicants have recognized and appreciated that a network interface that supports offload of network presence can be particularly beneficial in an enterprise setting. Enterprise networks generally contain many devices that generate requests to which networked computing devices must respond to maintain their network presence, but that do not require significant processing. Such functions can therefore be readily offloaded to a network interface with simple circuitry, but, by avoiding the need for computing devices throughout the enterprise to return frequently to an active mode for performing those functions, significant power can be saved.

Any suitable components may be used to offload network presence functions to a network interface card. In some embodiments, a network interface may provide network presence offload functionality by incorporating a network presence offload component. The network presence offload component may provide responses to frequently used network requests that are intended to discover the computing device and ensure its presence of the network. Furthermore, the network presence offload component may enable the network interface card to periodically send over the network certain information in accordance with some network protocols.

In some embodiments, the network interface card may advertise its network presence offload capabilities so that a computing system may offload those functions that are supported by the interface. An operating system or other component that configures the computing device may receive the capability information when the network interface card is initialized. The network presence offload component may then be configured based on the information. Further, when the computing device transitions to a sleep mode, the network presence offload component on the network interface card may be enabled to provide the network presence offload functionality for which it has been configured.

When enabled in sleep mode, the configured network interface card may receive and process messages directed to the computing device. The processing may comprise determining whether the messages trigger one of the offloaded network functions, and, if this is the case, responding to the messages without waking up the computing device. Received messages that are not associated with offloaded functions may be processed further to determine whether the messages should trigger the processor or other components of the computing device to wake up to respond to the message.

The inventors have appreciated and recognized that a particularly beneficial set of functions to be offloaded to the network interface card is a set of functions that maintain network presence of the computing device. These functions may include those that require a simple response to a request message in accordance with a known protocol. The request may be, for example, an Address Resolution Protocol (ARP) request, a Neighbor Discovery Protocol (NDP) Neighbor Solicitation (NS) request, an Internet Protocol version 4 (IPv4) Internet Control Message Protocol (ICMP) echo request, and an Internet Protocol version 6 (IPv6) Internet Control Message Protocol (ICMP) echo request. In response to each request, a network presence offload component configured to provide responses to this type of requests, may reply to the request.

Though, other functions may also be performed, including those that initiate action to maintain a network presence. For example, in some embodiments of the invention, to maintain network presence of the computing device connected to a network, a network presence offload component of the network interface card may be configured to send keep-alive packets using a Teredo protocol. Furthermore, network presence offload components of the network interface card may be configured to maintain a wireless connection to the computing device in the low power state. As a specific example, the offload component may periodically perform a handshake protocol used in the wireless connection and renegotiate, when required, encryption keys for the connection. The handshake protocol may be any suitable handshake protocol. For example, the protocol may be 802.11 Robust Security Network (RSN) two-way or four-way handshake protocol.

Figure 1:
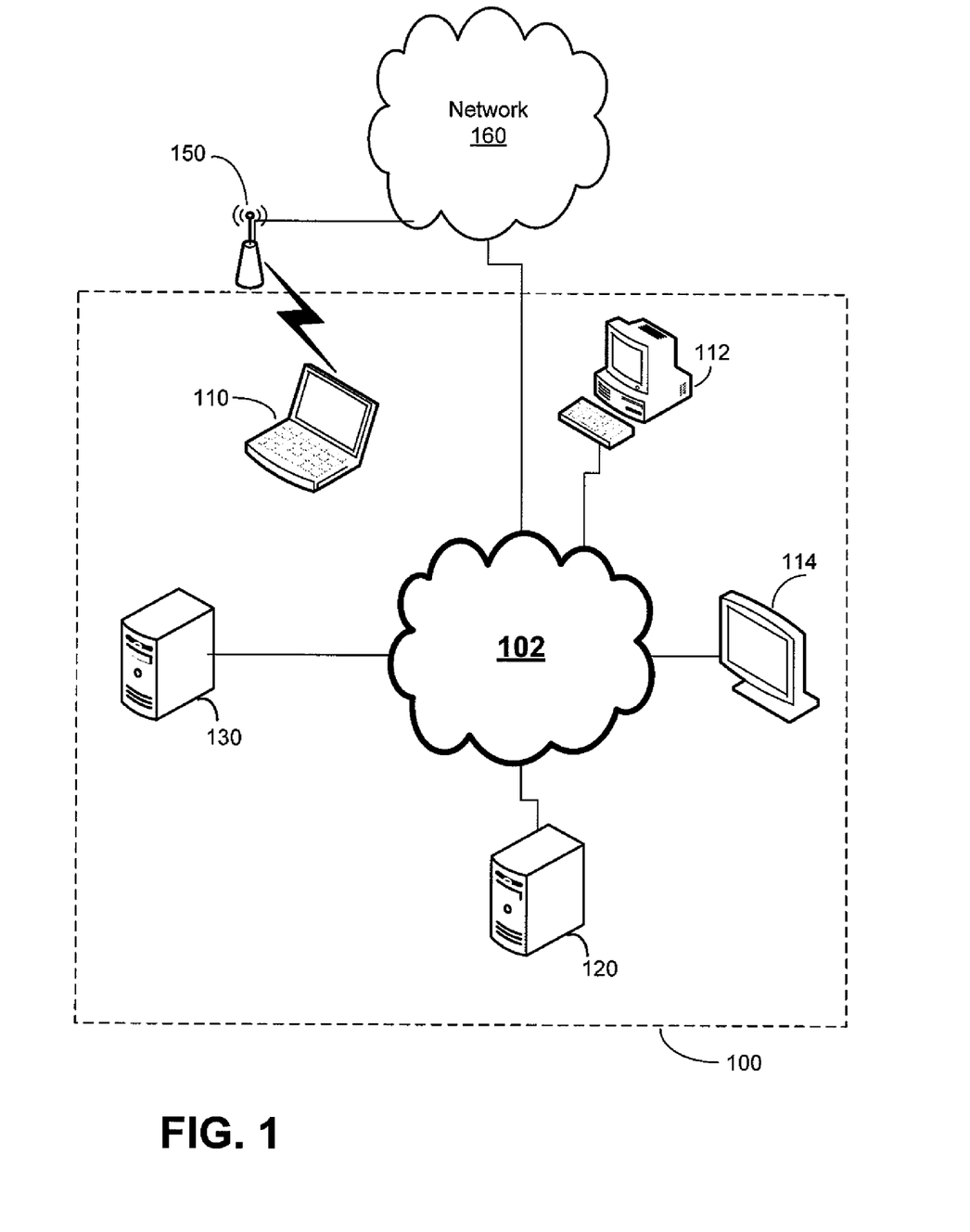
FIG. 1 is a sketch of a network environment in which some embodiments of the invention may be implemented.

FIG. 1 provides an example of a computer system in which some embodiments of the invention may be employed. Though the invention is not limited to use in any specific setting, FIG. 1 shows an enterprise network 100, such as may be deployed in a company or other organization. The computer system includes a network 102 that provides interconnectivity between multiple computing devices. Network 102 may be, for example, a local area network (LAN). Multiple computing devices, of which devices 110, 112 and 114 are illustrated, may be connected to network 102. Each computing device may be connected to the network in any suitable way. For example, computing devices 112 and 114 are illustrated to be connected to network 102 using wired connections. In contrast, client computer 110 is shown connected to network 102 through a wireless network 160. In this example, computing device 110 may maintain its network presence by maintaining a wireless connection through access point 150, even when in sleep mode.

To communicate with network 102, each of the computing devices 110, 112 and 114 may include a network interface such as a network interface card (NIC). A driver for each NIC is installed on a computing device when the NIC is initialized on the device. In this example, computing devices within enterprise network 100 may be accessed from a network 160 (e.g., the Internet) via an access point 150.

In the embodiment illustrated, the computer system of FIG. 1 may also include servers such as servers 120 and 130 for storing data or providing other functions within the enterprise. Once clients connect to network 102, they may access servers 120 and 130. It should be appreciated that FIG. 1 shows a simplified representation of an enterprise network. An enterprise network may typically include multiple computing devices, servers and other elements. Additionally, a network may include multiple local area networks or have a network topology more expansive than illustrated in FIG. 1. Though network presence offload is described in connection with user computing devices 110, 112 and 114, it may be employed with any of these devices.

Each of the computing devices 110, 112 and 114, when not in use, may be placed in a sleep mode to conserve electrical energy within the enterprise. However, it may be desirable to maintain a connection over network 102 to each of the devices 110, 112 and 114 even when they are placed in a low power state, such as the sleep mode. Maintaining a connection may enable remote access to a computing device or to allow a user to quickly resume operation of the computing device. For example, a user may wish to remotely access files on the device. Thus, while the computing device such as any of devices 110, 112 and 114 is in the low power state, it may receive messages over the network. Some of these messages may require processing on the computing device. For example, messages that require storage, generation or retrieval of information require processing. Though, other messages may simply serve to maintain a network connection. In some embodiments of the invention, messages that do not require processing by the computing device may be received and processed by the NIC associated with the device.

As a result, network presence of the computing device is offloaded to the NIC, as described below. In addition, it should be appreciated that connections to servers 120 and 130, or any other computing device, may similarly be maintained when the servers are placed in a sleep mode.

Figure 2:
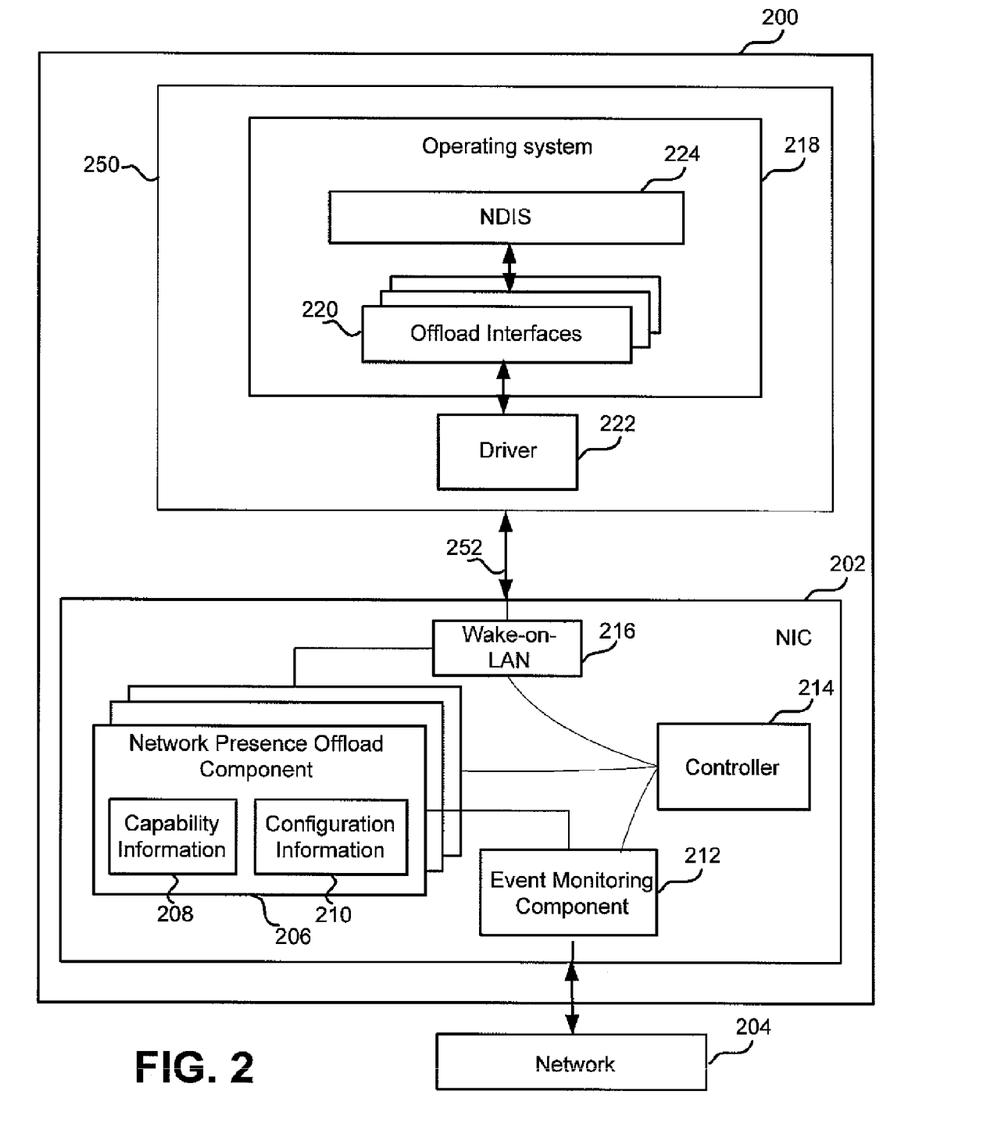
FIG. 2 is a block diagram of components of a computing device according to one embodiment of the invention.

FIG. 2 illustrates components of a computing device 200 according to some embodiments of the invention. Computing device 200 is configured to operate in multiple power states. For example, computing device 200 is operable in an active mode and one or more lower power states, called sleep modes.

In active mode, all of the components of the computing device 200 may be powered on and functioning. Server power status may be implemented by selectively powering off some components. For example, processor 250, upon which operating system 218 and application programs (not shown) may execute, may be powered off in sleep mode. Though some components, to provide limited functionality may be powered on in sleep mode. In examples described herein, network interface card 202 stays powered on in sleep mode. Though, other combinations of powered on or powered off components may be used to implement a sleep mode and a computing device may support multiple sleep modes. Though, for simplicity, only one sleep mode is described. In this example, a computing device 200 employs a network interface 202, such as a NIC, to provide access of device 200 to a network 204 (e.g., network 102). Network interface 202 implementing network input/output (I/O) operations may be any suitable network interface as embodiments of the invention are not limited in this respect and may be implemented using technology as known in the art for interfacing to one or more networks. Such technology may include firmware, control circuitry or other control mechanisms that can be adapted to control NIC 202 to perform network presence offload functions as described in greater detail below.

In operation, NIC 202 sends and receives messages over network 204. In active mode, received messages are passed over bus 252 for processing within processor 250. In sleep mode, received messages may be selectively passed over bus 252 for processing within the processor 250. For such processing, processor 250 must "wake up" to return to an active state. To wake up processor 250, NIC 202 may assert a wake up signal on bus 252. Such wake up signals may be generated, transmitted and processed according to known power management protocols. However, any suitable mechanism for NIC 202 to wake processor 250 may be used. Though, because NIC 202 supports network presence offload, some messages received over network 204 may be processed within NIC 202 without waking processor 250.

Network interface 202 may comprise one or more network presence offload components, such as a network presence offload component 206, providing network presence offload functionality according to some embodiments of the invention. When enabled, network presence offload component 206 may respond to network messages that do not require processing within processor 250 but for which a response maintains a network presence of computing device 200. Such messages may include control messages and messages that solicit a response media access control (MAC) data, such as an IP address being used by NIC 202. Additionally, offload component 206 when enabled may perform other actions that maintain a network presence for computing device 200, such as periodically sending keep-alive messages or renewing a key. FIG. 2 illustrates that network presence offload component 206 may perform multiple network presence offload functions. If multiple functions are supported, all of the functions may be processed in a single component or, network presence offload component 206 may include multiple processing engines, with each processing engine performing one or more offload functions.

The number and type of network presence offload functions supported by network presence offload components 206 is not critical to the invention. In some embodiments, network presence offload component 206 may be configurable to vary the number or type of offload functions performed. Also, network presence offload component 206 may advertise the functions it can be configured to perform.

Capability information 208 may comprise information on network presence offload functions that network presence offload component 206 is capable of performing. For example, capability information 208 may comprise information on specific types of messages received by network interface 202 over network 204 that it can process. The messages may be, for example, an Address Resolution Protocol (ARP) request, a Neighbor Discovery Protocol (NDP) Neighbor Solicitation (NS) request, an IPv4 Internet Control Message Protocol (ICMP) echo request, and an IPv6 Internet Control Message Protocol (ICMP) echo request. Capability information may be incorporated in network presence offload component 206 in any suitable way. For example, at the time that network presence offload component 206 is manufactured or programmed, capability information may be stored in any suitable way on NIC 202. For example, such information may be burned into flash memory. The information may be encoded in any suitable way, such as a list of message types to which network presence offload component 206 can respond, a list of functions that network presence offload component 206 is capable of performing or a code or codes identifying a set of capabilities of network presence offload component 206.

In some embodiments, network presence offload component 206 may support more functions than will be offloaded in a single computer. Additionally, in some embodiments, either the configuration or operation of operating system 218 or other components executing on processor 250 may depend on the functions offloaded to network presence offload component 206. Accordingly, a mechanism may be provided for processor 250 to gain access to capability information 208. In the embodiment illustrated, driver 222 may provide an interface to NIC 202 that contains a mechanism by which capability information 208 may be made available to operating system 218 or other component executing on processor 250.

For example, when network interface 202 is initialized or at any other suitable time, network interface 202 may provide capability information 208 to processor 250. Receiving the information on the network presence offload capabilities from capability information component 208 may comprise receiving information identifying one or more sets of network presence offload functions. An operating system 218 of computing device 200 may receive the information via suitable component(s) such as offload interfaces 220 that are interfaces for device driver 222. In this example, driver 222 is installed on computing device 200 when network interface 202 is initialized. Driver 222 may be a software component programmed to operate network interface 202. To allow network interface 202 to work in computing device 200, a standard interface is specified between a network stack and driver 222. In computing devices in which the WINDOWS® operating system is employed, the standard interface standard is referred to as Network Driver Interface Specification (NDIS). NDIS is shown as component 224 in FIG. 2.

In the example illustrated, operating system 218 or any other suitable component may configure network presence offload component 206 using the capability information 208 provided by network interface 202 to NDIS 224 or other suitable component executing on processor 250. The capability information may be used to determine an allocation of network functions to be performed when computing device 200 is in sleep mode. One or more of the functions supported by network presence offload component 206, as identified by capability information 208, may be assigned to network presence offload component 206. In the example illustrated in FIG. 2, those network functions not allocated to network presence offload component 206 are performed within processor 250. These two choices for allocation of network functions are shown for simplicity. Processing of network functions may be allocated to any number of suitable components.

Regardless of the mechanism for processing network functions not allocated to network presence offload component 206, network presence offload component 206 is configured to perform those functions allocated to it. Network presence offload component 206 may be configured via an offload interface from offload interfaces 220. In embodiments in which multiple network presence offload components exist on NIC 202, each of the offload interfaces 220 may correspond to one such network presence offload component Thus, each network presence offload component in network interface 202 may be configured through an offload interface in operating system 218 of computing device 200. However, it is not necessary that there be a separate offload interface for each offload component or for each function. As an example of one alternative, configuration of all offload functions may be performed through a single interface that receives a parameter identifying the offload function being configured. Regardless of the mechanism through which configuration information is supplied to network presence offload component 206, the information may be stored on NIC 202. In the example illustrated, configuration information 210 is stored within network presence offload component 206. Such information may, for example, be stored in RAM memory associated with network presence offload component 206. However, the specific structure used to store configuration information 210 is not critical to the invention.

The content of configuration information 210 may depend on the functions allocated to network presence offload component 206. The configuration information 210 may identify functions to be performed by network presence offload component 206 when enabled and may alternatively or additionally include information used in performing those functions. As an example, when network presence offload component 206 is configured to respond to a request with a specific piece of information, such as a network address, the information may be stored as part of configuration information 210.

When computing device 200 is placed in a low power state, network presence offload component 206 of network interface 202 may be enabled to perform the functions for which it has been configured and therefore maintain network presence of computing device 200. In some embodiments of the invention, network presence offload component may be enabled automatically, in response to computing device entering a sleep mode. For example, a power management system as is known in the art within computing device 200 may trigger components, including NIC 202, to transition to sleep mode operation. When NIC 202 transitions to sleep mode operation, the functions of network presence offload component 206 that have been configured may be enabled. Though, network presence offload component 206 may be enabled in other ways. The enabling may be performed via, for example, a command sent via one or more of offload interfaces 220 to driver 222 as part of a power down routine of operating system 218. Also, it should be appreciated that it is not necessary that network presence offload component 206 be configured separately from being enabled. Some of the capabilities provided by network presence offload component 206 could be enabled during the configuration of network presence offload component 206.

Once configured and enabled, network presence offload component 206 may perform offload functions at appropriate times. Some functions may be performed at scheduled times, such as those functions that require periodic sending of information. Other offloaded functions may be performed in response to events. In the embodiment of FIG. 2, an event that triggers performance of an offloaded function is the receipt of a message directed to computing device 200 that requires a response in accordance with an offloaded function. In this example, network interface 202 may comprise event monitoring component 212 that detects messages on network 204 directed to computing device 202. Event monitoring component 212 may detect a message and provide it to network presence offload component 206. Network presence offload component 206 may be capable of determining whether the message is of a type that triggers a response in accordance with an offloaded function. When the message triggers a response, network presence offload component 206 may send a reply to the message.

The reply may comprise information based on the configuration of network presence offload component 206, as discussed in more detail below. For example, if network presence offload component 206 has been configured to reply to messages comprising ARP requests with a Media Access Control (MAC) address and the detected message is an ARP request, network presence offload component 206 can reply to the ARP request with a MAC address in accordance with the ARP protocol as known in the art. Similarly, if network presence offload component 206 has been configured to reply to messages comprising Neighbor Discovery Protocol (NDP) Neighbor Solicitation (NS) requests and the detected message is an NDP NS request, network presence offload component 206 can reply to the NDP NS request with the MAC address of the computing device.

Event monitoring component 212 may be implemented in any suitable way. In some embodiments, invent monitoring component 212 may be implemented using techniques known in the art for implementing Wake-on-LAN functionality. In some embodiments, network interface 202 may perform Wake-on-LAN processing as is known in the art for any received messages that are not processed by network presence offload component 206. In FIG. 2, network interface 202 comprises a Wake-on-LAN (WoL) component 216 which allows waking up computing device 200 when a detected message received over network 204 does not belong to messages to be processed by the network presence offload components in accordance to some embodiments of the invention. The WoL functionality of WoL component 216 may wake computing device 200 to process messages received over network 204, as known in the art.

Any suitable architecture may be used to ensure that events detected by event monitoring component 212 are processed in either network presence offload component 206 or by Wake-on-LAN component 216. For example, when event monitoring component 212 detects such a message, network presence offload component 206 may process the detected message and determine that the message does not belong to a set of messages to which network presence offload component 206 will provide a reply based on the configuration of the network presence offload component 206. In this scenario, event monitoring component 212 may then provide the message to WoL component 216 which, upon receiving the message, generates a wake-up event based on information provided in the message to wake up, or power on, computing device 200 though other configurations are possible. For example, events detected by event monitoring component 212 may be routed to network presence offload component 206. Network presence offload component 206 may process those events that it is configured to process. Those events that network presence offload component 206 is not configured to process may be routed to Wake-on-LAN component 216. In this way, network presence offload component 206 may act as a filter for detected network events. Those events that pass through the filter implemented by network presence offload component 206 may then be processed in conventional ways, including within Wake-on-LAN component 216. As an example of another possible configuration, processing of events may be controlled by controller 214.

It should be appreciated that computing device 200 and network interface 202 may include any other suitable components that are not shown here for simplicity. It should also be appreciated that components of network interface 202 shown in FIG. 2 may be implemented in software, hardware, firmware or a combination thereof. In one embodiment, the components may be circuits configured to provide the described functionality. Moreover, the network presence offload components as described above and other components required to provide functionality in accordance with some embodiments of the invention may be implemented in devices other than the network interface.

Figure 3:
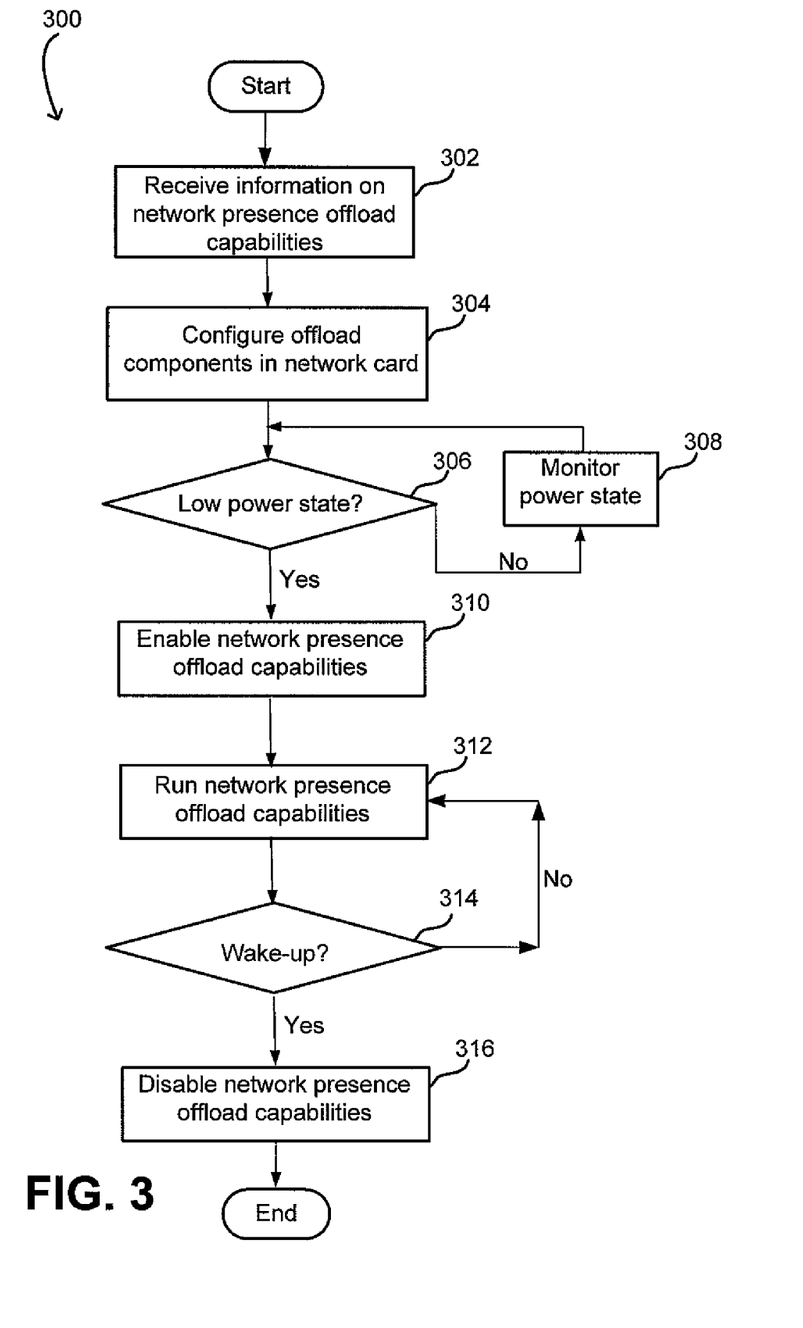
FIG. 3 is a flowchart of a process of operating a computing system that supports offloading network presence functions to a network interface card according to one embodiment of the invention.

FIG. 3 illustrates a method of operating a computing system that supports offloading network presence functions to a NIC according to some embodiments of the invention. Process 300 may start at any suitable time. For example, process 300 may start when a NIC (e.g., network interface 202) is initialized. At block 302, the operating system 218 or other component of the computing device may receive information on network presence offload capabilities of network interface offload components of the NIC. For example, as shown in FIG. 2, capability information 208 of network interface 202 may be provided through driver 222. Receiving the information on the network presence offload capabilities may comprise receiving information identifying one or more sets of network presence offload functions of a network presence offload component.

At block 304, the network interface offload components in the NIC may be configured based on the information on the network presence offload capabilities received from the NIC. For example, operating system 218 may select some Or all of the supported functions for implementation on the NIC. In some embodiments, the network interface offload components may be configured to respond to messages received over the network and comprising requests in accordance with network protocols by providing respective replies over the network, the replies being based on the configuring. The requests may be, for example, IPv4 ARP requests, IPv6 NDP NS requests, IPv4 ICMP echo requests, and IPv6 ICMP echo requests.

Furthermore, network interface offload components may be configured to support a certain number of the above request/reply pairs. For example, a network interface offload component may be configured to provide a certain number of IPv4 ARP replies in response to IPv4 ARP requests received over the network. Similarly, other network interface offload component may be configured to support a certain number of IPv6 NDP NS requests/responses, IPv4 ICMP requests/responses, and IPv6 ICMP requests/responses.

In some embodiments, the network interface offload components may be configured to send at a defined rate keep-alive packets using a Teredo protocol. The configuration process may comprise defining the rate with which the keep-alive packets are to be sent. For example, a network interface offload component may be configured to send keep-alive packets using a known functionality of the Teredo protocol every 30 seconds. Though, any other suitable rate may be substituted. The Teredo is a known protocol for transporting packets between computing devices that support only IPv4 and computing devices that support IPv6. A Teredo server is used by a Teredo client both to determine whether the client is behind a Network Address Translation (NAT) (and if so, to determine a type of NAT), and also to keep the NAT "alive" so that the NAT will allow incoming traffic and forward it to the correct client.

In some embodiments where the computing device is connected to a wireless network, the network interface offload components may be configured to maintain a wireless connection to the computing device. The wireless connection may be encrypted in any suitable way using one or more encryption keys. The network interface offload component may be configured to take actions that change the encryption keys used by the computing device for communication over the wireless connection even though the computing device is in sleep mode. For example, the network interface offload components may be configured to provide, in response to an authentication request received by the NIC, a response in accordance with a handshake protocol. The handshake protocol may be any suitable handshake protocol. For example, the protocol may be 802.11 Robust Security Network (RSN) two-way or four-way handshake protocol. Further, when the encryption keys used to secure data provided via the wireless connection change, the network interface offload components may renegotiate encryption keys to maintain the wireless connection.

Regardless of the functions that the network interface card is configured to perform, in the process of FIG. 3, the network interface card does not perform those functions until the computing device is placed in a low power state corresponding to a sleep mode. FIG. 3 shows that, at block 306, it may be determined whether the computing device is in a low power state. The computing device may be placed in the low power state when, for example, it is not actively used by a user, or for any other reason. The power state of the computing device may be determined using techniques as are known in the art or any other suitable method. For example, a hardware component monitoring a current power state of the computing device may provide information on whether the computing device is in the low power state.

When it is determined at block 306 that the computing device is in the low power state, process 300 may proceed to block 310 where the network interface offload components may be enabled. The enabled network interface offload components may then perform their functionality of providing information to verify the network presence of the computing device. It should be appreciated that some or all of the capabilities provided by one or more of the network presence offload components may be enabled during the configuration of the components. In scenarios in which some capabilities are enabled before sleep mode is entered, when computing device transitions to the low power state, other capabilities provided by network presence offload components may be enabled.

When it is determined at block 306 that the computing device is not in the low power state, process 300 may branch to block 308 to continue monitoring a current power state of the computing device.

After the network interface offload component has been enabled, the NIC may run the network presence offload capabilities of the configured network interface offload component, at block 312. The network presence offload capabilities comprise processing by the configured network interface offload component messages received by the NIC over the network. For example, as discussed above, a network interface offload component may be configured to respond to IPv4 ARP requests received over the network with the MAC address of the computing device. Similarly, alternatively or additionally, the network interface offload component may be configured to respond to an IPv6 NDP NS request with the MAC address. Network interface offload component also may be configured to respond to an IPv4 Internet Control Message Protocol (ICMP) echo request and an IPv6 Internet Control Message Protocol (ICMP) echo request with the respective echo replies.

In some embodiments of the invention, the computing device may have, via a router, a connection established with a Teredo server. In these embodiments, the network presence offload component may be configured to send, when enabled, keep-alive packets using a Teredo protocol to thus maintain a connection of the computing device to the network. These packets may be sent at a defined rate, which may be set as part of the process of configuring the network presence offload component. When the computing device transitions to the sleep mode, the thus configured network presence offload component may send keep-alive packets, for example, every 30 seconds. Though, it should be appreciated that the packets may be sent at any suitable rate as embodiments of the invention are not limited in this respect.

Furthermore, in embodiments where wireless network presence of the computing device if offloaded to the NIC, the network interface offload components may be used to maintain a wireless connection to the computing device, as discussed above.

Once enabled, the network presence offload component of the network interface card may continue to perform offload functions for any suitable period of time. In some embodiments, the offload component may be configured to continue performing offload functions until the computing system wakes up. Accordingly, process 300 includes decision block 314 at which a check is made of whether the computing system is to wake up. If the computing system does not wake up, process 300 loops back to block 312, where the network interface continues to perform offload functions. Conversely, if the computing system wakes up, processing proceeds to block 316.

Any suitable mechanism may trigger the process to branch to block 316 from decision block 314. For example, user input to the computing device may cause the computing device to wake up. Alternatively, an internal event, such as expiration of a timer, may cause the computing device to wake up. Alternatively or additionally, a message received over a network may cause the computing device to wake up. For example, the network interface card may receive a WoL packet, a WoL bitmap or any other suitable packet. In response, the NIC may generate a wake-up event based on the wake-up packet to wake up the computing device.

Regardless of the trigger for the computing device to wake up, when the device wakes up, process 300 may branch to block 316 where the capabilities of the network interface offload components may be disabled. In embodiments in which offloaded functions involve collecting data that is used by processing after the computing device wakes up, processing at block 316 may include transfer of data from NIC 202 to processor 250. For example, in embodiments of the invention in which the computing device is connected to a wireless network and the network interface offload components are configured to maintain a wireless connection to the computing device by renegotiating encryption keys for a handshake protocol used in the connection, when the network interface offload components are disabled, information on the encryption keys and any other information used by the network interface offload components to maintain the connection may be obtained from the network interface offload component. Process 300 may then end.

Figure 4:
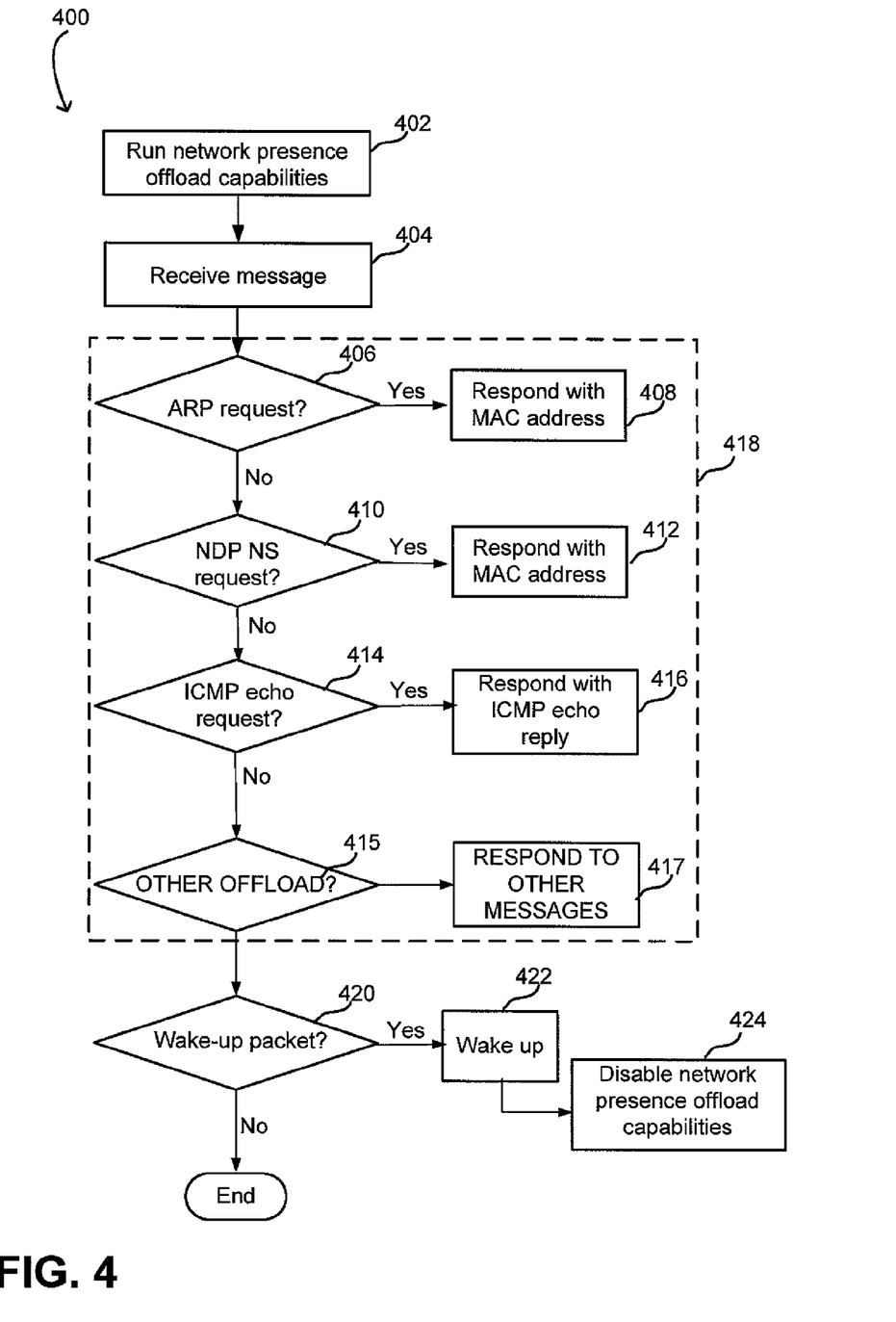
FIG. 4 is a flowchart illustrating processing of a packet using network presence offload components according to one embodiment of the invention.

FIG. 4 illustrates in more detail processing of a packet using network presence offload components according to one embodiment of the invention. In the embodiment illustrated, a NIC includes separate network presence offload components for responding to messages of different types. A process 400 may start at block 402 when the NIC is running the capabilities of the network interface offload components when the computing device is in sleep mode, as discussed above, for example, with reference to block 312 in FIG. 3. At block 404, process 400 may receive a message over the network directed to the computing device on which process 400 is performed. The message may be identified by any suitable component of the NIC such as, for example, event monitoring component 212 of FIG. 2.

Next, in a decision block 406, it may be determined whether the message comprises an ARP request (e.g., an IPv4 ARP request). Such a message may be identified for example as one having an operation code equal to one. Though, such a message may be identified in any suitable way. When it is determined that the message comprises the ARP request, a network presence offload component configured to respond to ARP requests may provide a reply to the request. Thus, at block 408, process 400 may respond with the MAC address of the computing device.

When it is determined at decision block 406 that the message does not comprise the ARP request, process may branch to a decision block 410 where it may be determined whether the message comprises an NDP NS request (e.g., an IPv6 NDP NS request) such a message may be identified, for example, as one having an operation code equal to 135. Though, such a message may be identified in any suitable way. When it is determined that the message comprises the NDP NS request, a network presence offload component configured to respond to NDP NS requests may provide a reply to the request. Thus, at block 412, process 400 may respond with the MAC address of the computing device.

When it is determined at decision block 410 that the message does not comprise the NDP NS request, process may branch to a decision block 414 where it may be determined whether the message comprises an ICMP echo request (e.g., an IPv4 ICMP echo request or an IPv6 ICMP echo request). Such a message may be identified, for example, as one having an operation code equal to 8. Though such a message may be identified in any suitable way. When it is determined that the message comprises the ICMP echo request, a network presence offload component configured to respond to respective (e.g., IPv4 or IPv6) ICMP echo requests may provide an ICMP echo reply to the request, at block 416. It should be appreciated that two separate network presence offload components may respond to IPv4 ICMP echo requests and IPv6 ICMP echo requests, respectively.

Next, when it is determined at decision block 414 that the message does not comprise the ICMP echo request, process 400 may proceed to decision block 415 where it is determined whether the received messages requires some other offload processing. Blocks 408, 412 and 416 illustrate offload processing in response to three types of messages. In some embodiments, offload processing of only these three types of messages may be performed. Though, in other embodiments, it may be desirable to offload processing of other messages. Accordingly, FIG. 4 illustrates that possibly other messages will be processed within block 418.

When, as determined at decision block 415, a received message relates to other offload functions, the received message may be processed at block 417. As one example, it is described below in conjunction with FIG. 6 that certain protocols require periodic re-keying of endpoints. While messages involved in re-keying could trigger the processor to wake up, processing of such messages could be offloaded to a NIC.

Regardless of the number of offload functions supported by a particular NIC, if a received message does not relate to any offloaded function, process 400 may follow to decision block 420 where it may be determined whether the detected message is a wake-up packet (e.g., a WoL packet, a WoL bitmap or any other suitable packet). If this is the case, process 400 may follow to block 422 where the NIC (e.g., WoL component 216) may generate a wake-up event based on the wake-up packet to wake up the computing device. Further, at block 424, the capabilities of the network interface offload components may be disabled. When it is determined at decision block 420 that the message does not comprise the wake-up packet, process 400 may end.

FIG. 4 shows that processing performed within block 418 comprises processing of the message by the network presence offload components, or engines, according to some embodiments of the invention where the network presence of the computing device is offloaded to the NIC. Thus, network traffic such as the detected message which would otherwise cause the host computing device to wake up is processed by the NIC thus avoiding the unnecessary waking-up of the host computing device. The computing device can therefore continue operating in sleep mode where its power consumption is reduced, which allows saving power. It should be appreciated that determining what type of request the message detected in the NIC comprises may be performed in any suitable order. Because the NIC has multiple network presence offload components each providing different capabilities, in some embodiments, more than one message may be simultaneously processed.

Figure 5:
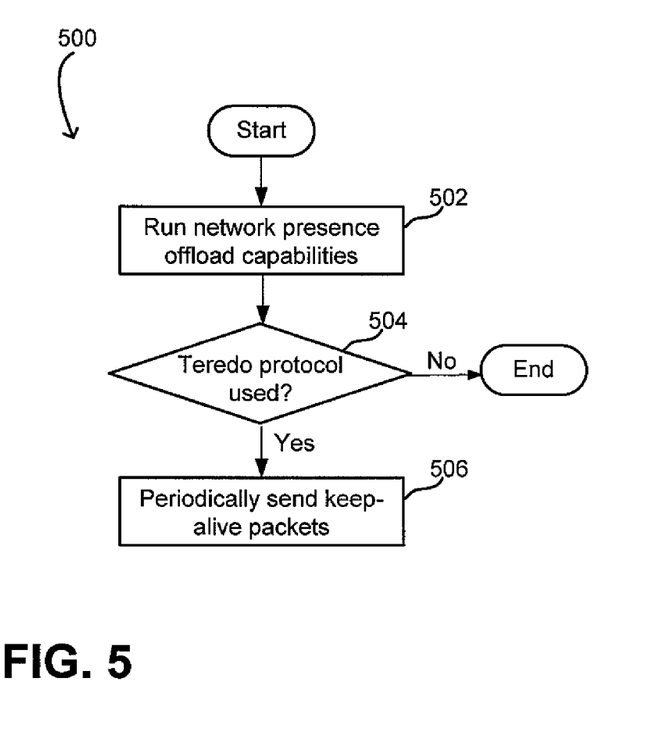
FIG. 5 is a flowchart of a process of maintaining a network connection using a Teredo protocol according to one embodiment of the invention.

As discussed above, in some embodiments, one or more of the network presence offload components may be configured to send at a defined rate keep-alive packets using a Teredo protocol. FIG. 5 shows such a process 500 implemented to maintain a wireless connection of the computing device to a network.

Process 500 may start at any suitable time. For example, it may start at block 502 when the NIC is running the capabilities of the network interface offload components when the computing device is in the low power state, as discussed above. It should be appreciated that process 400 may be performed at block 312 of FIG. 3.

At block 504, it may be determined whether a Teredo protocol is used on the network. When it is determined that this is the case, process 500 may branch to block 506 where keep-alive packets may be sent at a defined rate using the Teredo protocol. The rate may be defined during configuration of the respective network presence offload component. As shown in FIGS. 3 and 4, process 500 may terminate when a wake-up packet is received by the NIC. When it is determined that the Teredo protocol is not used, process 500 may end.

Figure 6:
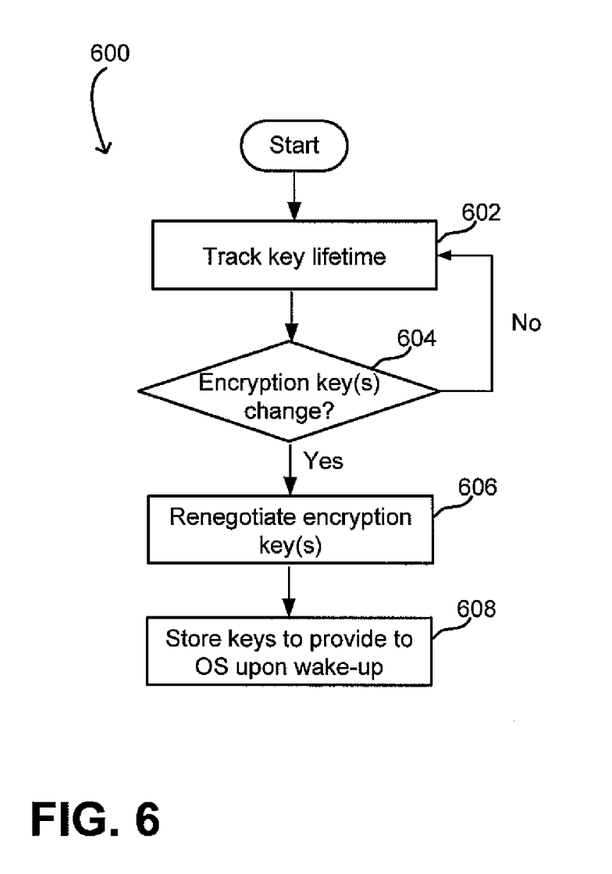
FIG. 6 is a flowchart of a process of maintaining a network connection using a handshake protocol according to some embodiments of the invention.

The network presence offload components of the NIC may be configured to maintain a wireless connection to the computing device in the low power state. In some embodiments, one or more of the components may periodically perform a handshake protocol used in the wireless connection. The handshake protocol may be any suitable handshake protocol such as, for example, 802.11 RSN two-way or four-way handshake protocol. When encryption keys used in the handshake protocol change, the network interface offload components may renegotiate the encryption keys to maintain the wireless connection. FIG. 6 illustrates a process 600 in which a handshake protocol is offloaded to the NIC according to one embodiment of the invention.

Process 600 may start at any suitable time. For example, it may start when a computing device accessed wirelessly is placed into sleep mode. At block 602, lifetimes of each of the encryption keys used in the handshake protocol may be tracked. Initial values for the keys used in the wireless connection may be provided by the operating system of the computing device if the operating system performed a handshake protocol using the keys before the computing device transitions to sleep mode.

At block 604, it may be determined whether any of the encryption keys change. When this is the case, process 600 may branch to block 606 where the one or more of the network interface offload components may utilize their network presence offload to renegotiate the encryption keys. Next, the encryption keys may be stored at block 608 to be then provided to the operating system of the computing device upon a wake-up of the device. Thus, the key exchange is uploaded to the operating system when the computing device exits the sleep mode. When it is determined, at block 604, that the encryption key(s) have not changed, process 600 may return to block 602 to continue tracking lifetime of the keys.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
    receiving, from a network interface of a computing device, information on one or more capabilities of a network presence offload component of the network interface, including information on first and second network presence offload functions supported by the network presence offload component;
    configuring the network presence offload component, based on the information on the one or more capabilities of the network presence offload component, to perform the first network presence offload function during a low power state, the configuring performed through a single offload interface that is an interface between an operating system of the computing device and a device driver for the network interface;
    allocating, based on the information on the one or more capabilities of the network presence offload component, the second network presence offload function to be performed by a processor of the computing device during the low power state;
    responsive to the computing device transitioning to the low power state, enabling the network presence offload component of the network interface;
    in response to receiving a message over the network connection, providing, via the network presence offload component, a reply over the network connection without waking up other components of the computing device, the reply being based at least in part on the message being associated with the network presence offload function; and
    storing information associated with the reply in the network presence offload component.

2. The method of claim 1, wherein the receiving the information on the one or more capabilities of the network presence offload component and the configuring comprise communicating with the network interface through a driver according to a Network Driver Interface Specification (NDIS).

3. The method of claim 1, wherein the first network presence offload function comprises sending, at a defined rate, keep-alive packets using a Teredo protocol.

4. The method of claim 1, wherein the configuring occurs during initialization of the network interface.

5. The method of claim 1, wherein:
the network presence offload component comprises one component of a plurality of network presence offload components;
the receiving the information on the one or more capabilities of the network presence offload component comprises receiving information on the one or more capabilities of the plurality of network presence offload components;
the configuring comprises configuring the plurality of network presence offload components; and
the receiving the information on the one or more capabilities of the plurality of network presence offload components and the configuring are performed via a plurality of interfaces in the computing device.

6. The method of claim 1, further comprising waking up the computing device in response to receiving a different message that is determined to not trigger the network presence offload function.

7. The method of claim 1, wherein the message comprises at least one of an Address Resolution Protocol (ARP) request, a Neighbor Discovery Protocol (NDP) Neighbor Solicitation (NS) request, an IPv4 Internet Control Message Protocol (ICMP) echo request, and an IPv6 Internet Control Message Protocol (ICMP) echo request.

8. The method of claim 1, further comprising transferring the stored information associated with the reply from the network presence offload component to a processor of the computing device responsive to the computing device exiting the low power state.

9. The method of claim 1, further comprising disabling the network presence offload component of the network interface responsive to the computing device exiting the low power state.

10. The method of claim 1, wherein:
the first network presence offload function comprises, in response to receiving an authentication request, providing a response in accordance with a handshake protocol using at least one encryption key;
renegotiating a different encryption key to maintain the wireless connection; and providing a reply that includes the different encryption key.

11. A computing device comprising:
a network interface comprising a network presence offload component; and
a computer-readable storage medium storing computer-executable instructions that, responsive to execution by the computing device, perform operations including:
receiving, from the network interface, information on one or more capabilities of a network presence offload component of the network interface, including information on first and second network presence offload functions supported by the network presence offload component;
providing a command to the network interface to configure the network presence offload component based at least in part on the information on the network presence offload component, the configuring performed through a single offload interface that is an interface between an operating system of the computing device and a device driver for the network interface; and
responsive to the providing, causing the network interface to perform the first network presence offload function by performing operations including:
enabling, responsive to the computing device transitioning to a low power state, the network presence offload component of the network interface;
after receiving a message over the network, providing, via the network presence offload component, a reply over the network without waking up other components of the computing device; and
responsive to the computing device exiting the low power state, transferring data collected in association with the reply to the computing device and disabling the network presence offload component; and
allocating, based on the information on the one or more capabilities of the network presence offload component, the second network presence offload function to be performed by a processor of the computing device during the low power state.

12. The computing device of claim 11, wherein the providing the command to the network interface to configure the network presence offload component comprises providing a command to the network interface to configure the network presence offload component to send, at a defined rate, keep-alive packets using a Teredo protocol to maintain a connection of the computing device to the network.

13. The computing device of claim 11, wherein the providing the command to the network interface to configure the network presence offload component comprises providing a command to the network interface to configure the network presence offload component to provide a defined number of replies over the network.

14. The computing device of claim 11, wherein the reply is based at least in part on the network presence offload component negotiating an encryption key to maintain a network connection such that the negotiated encryption key is usable by the network presence offload component in a handshake protocol as part of maintaining the network connection, the operations further including:
causing the network interface to store the negotiated encryption key within the network presence offload component; and
providing the stored encryption keys to an operating system of the computing device responsive to disabling the network presence offload component.

15. A system comprising:
one or more hardware processors; and
at least one computer-readable storage medium storing computer-executable instructions that, responsive to execution by the one or more hardware processors, cause the system to perform operations including:
receiving, from the network interface of a computing device, information on one or more capabilities of a network presence offload component, including information on first and second network presence offload functions supported by the network presence offload component;
configuring the network presence offload component, based on the information on the one or more capabilities of the network presence offload component, to perform the first network presence offload function during a low power state, the configuring performed through a single offload interface that is an interface between an operating system of the computing device and a device driver for the network interface;
allocating, based on the information on the one or more capabilities of the network presence offload component, the second network presence offload function to be performed by a processor of the computing device during the low power state;
responsive to the computing device transitioning to the low power state, enabling the network presence offload component of the network interface;

in response to receiving a message over the network connection, providing, via the network presence offload component, a reply over the network connection without waking up other components of the computing device, the reply being based at least in part on the message being associated with the network presence offload function; and storing information associated with the reply in the network presence offload component.

16. The system of claim 15, wherein the receiving the information on the one or more capabilities of the network presence offload component and the configuring comprise communicating with the network interface through a driver according to a Network Driver Interface Specification (NDIS).

17. The system of claim 15, wherein the first network presence offload function comprises sending, at a defined rate, keep-alive packets using a Teredo protocol.

18. The system of claim 15, wherein the configuring occurs during initialization of the network interface.

19. The system of claim 15, wherein:

the network presence offload component comprises one component of a plurality of network presence offload components;

the receiving the information on the one or more capabilities of the network presence offload component comprises receiving information on one or more capabilities of the plurality of network presence offload components;

the configuring comprises configuring the plurality of network presence offload components; and the receiving the information on the one or more capabilities of the plurality of network presence offload components and the configuring are performed via a plurality of interfaces in the computing device.

20. The system of claim 15, the operations further including waking up the computing device in response to receiving a different message that is determined to not trigger the network presence offload function.

* * * * *